US012706534B2

(12) United States Patent
Chesneau

(10) Patent No.: US 12,706,534 B2
(45) Date of Patent: Aug. 11, 2026

(54) METHOD FOR CALIBRATING A SWITCHING CONVERTER

(71) Applicant: STMicroelectronics International N.V., Geneva (CH)

(72) Inventor: David Chesneau, Grenoble (FR)

(73) Assignee: STMicroelectronics International N.V., Geneva (CH)

( * ) Notice: Subject to any disclaimer, the term of this patent is extended or adjusted under 35 U.S.C. 154(b) by 198 days.

(21) Appl. No.: 18/597,428

(22) Filed: Mar. 6, 2024

(65) Prior Publication Data

US 2024/0305197 A1 Sep. 12, 2024

(30) Foreign Application Priority Data

Mar. 10, 2023 (FR) ...................................... 2302255

(51) Int. Cl.
*H02M 3/158* (2006.01)

(52) U.S. Cl.
CPC .................................. *H02M 3/158* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24;
(Continued)

(56) References Cited

U.S. PATENT DOCUMENTS 7,443,146 B2 * 10/2008 Wei ..................... H02M 3/1584 323/224
12,301,115 B2 * 5/2025 Wu ..................... H02M 3/1586
(Continued)

FOREIGN PATENT DOCUMENTS

EP 3945673 A1 2/2022
EP 3945674 A1 2/2022
EP 4089906 A1 11/2022

OTHER PUBLICATIONS

Chen, Chi-Lin, et al.: "Zero Current Detection Technique for Fast Transient Response in Buck DC-DC Converters," 2008 IEEE, 4 pgs.

(Continued)

*Primary Examiner* — Crystal L Hammond
*Assistant Examiner* — Nusrat Quddus
(74) *Attorney, Agent, or Firm* — Crowe & Dunlevy LLC

(57) ABSTRACT

A buck switching converter is calibrated using a method which alternates between first and second calibration phases. During each first calibration phase: a time period of low-side switch on state is kept constant and, for each current pulse in an inductor, a sign of a value of the current at the end of the time period of on state of the low-side switch is determined. Modification of a time period of high-side switch on state is made based on the determined sign. During each second calibration phase: a time period of high-side switch on state is kept constant and, for each current pulse in the inductor, a value of the current at the end of the time period of on state of the high-side switch is compared with a target value. Modification of the time period of low-side switch on state is made based on the comparison.

11 Claims, 4 Drawing Sheets

(58) Field of Classification Search

CPC .......... G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H02M 3/22; H02M 1/08; H02M 1/36; H02M 3/24; H02M 3/325; H02M 3/335; H02M 3/28; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/1584; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H05B 39/048; B23K 11/24; H04B 2215/069; Y02B 70/1491; H02J 3/46; H02J 3/38

See application file for complete search history.

(56) References Cited

U.S. PATENT DOCUMENTS

| | | | | |
|---|---|---|---|---|
| 2007/0085520 | A1 | 4/2007 | Ho | |
| 2009/0322298 | A1* | 12/2009 | Nishida | H02M 3/1588 323/282 |
| 2013/0093403 | A1* | 4/2013 | Jia | G05F 1/614 323/272 |
| 2016/0233768 | A1* | 8/2016 | de Cremoux | H02M 3/1588 |
| 2019/0068054 | A1* | 2/2019 | Ongaro | H02M 1/08 |
| 2022/0103074 | A1* | 3/2022 | Cai | H02M 3/1586 |
| 2022/0345040 | A1* | 10/2022 | Couleur | H02M 1/0009 |

OTHER PUBLICATIONS

INPI Search Report and Written Opinion for priority application, FR Appl. No. 2302255, report dated Aug. 24, 2023, 8 pgs.

* cited by examiner

METHOD FOR CALIBRATING A SWITCHING CONVERTER

PRIORITY CLAIM

This application claims the priority benefit of French Application for Patent No. 2302255, filed on Mar. 10, 2023, the content of which is hereby incorporated by reference in its entirety to the maximum extent allowable by law.

TECHNICAL FIELD

The present disclosure generally concerns electronic circuits and, in particular, switching converters.

BACKGROUND

Buck switching converters are configured to deliver, based on a Direct-Current (DC) power supply voltage, a DC output voltage at a value lower than that of the power supply voltage.

Buck converters operating in pulse frequency modulation (PFM) are a specific type of buck switching converters.

Known buck switching converters operating in pulse frequency modulation have disadvantages.

There exists a need to overcome all or part of the disadvantages of known buck switching converters operating in pulse frequency modulation.

In particular, there exists a need for a method of calibration of a buck switching converter operating in pulse frequency modulation which enables to overcome all or part of the disadvantages of known converters of this type.

SUMMARY

An embodiment provides a method of calibration of a buck switching converter operating in pulse frequency modulation, the method comprising an alternation of first and second calibration phases, each first calibration phase comprising: keeping constant a time period of on state of a low-side switch all along the first calibration phase; and for each current pulse in an inductor of the converter during the first calibration phase, determining a sign of a value of the current at the end of the time period of on state the low-side switch and modifying a time period of on state of a high-side switch of the next current pulse based on the determined sign; and each second calibration phase comprising: keeping constant the time period of on state of the high-side switch all along the second calibration phase; for a current pulse during said second calibration phase, comparing a value of the current at the end of the time period of on state of the high-side switch with a target value; and modifying the time period of on state of the low-side switch based on said comparison for the next current pulse.

According to an embodiment, during an initial first calibration phase, the time period of on state of the low-side switch is kept constant and equal to an initial value, and, during each next first calibration phase, the time period of on state of the low-side switch is kept constant and equal to the time period of on state of the low-side switch modified during the second calibration phase preceding said first calibration phase.

According to an embodiment, at each first calibration phase, the time period of on state of the high-side switch of the next current pulse is increased if the determined sign is negative, and is decreased if the determined sign is positive.

According to an embodiment, at each second calibration phase, the time period of on state of the low-side switch is increased if the comparison indicates that the value of the current at the end of the time period of on state of the high-side switch is lower than the target value and is decreased if the comparison indicates that the value of the current at the end of the time period of on state of the high-side switch is higher than the target value.

According to an embodiment, the comparison with the target value comprises: delivering a signal indicating the instantaneous value of the current with a current sensor; comparing said signal with a signal indicating the target value with a comparator; and storing a signal indicating the result of the comparison with a synchronous flip-flop controlled based on a signal for controlling the high-side switch.

According to an embodiment, the determination of the sign of the value of the current at the end of the time period of on state of the low-side switch comprises: determining the sign of the current in the inductor with a circuit, for example based on a voltage on a node of connection of the switches and on an output voltage of the converter; and storing the determined sign with a synchronous flip-flop controlled based on a signal for controlling the low-side switch.

An embodiment provides a buck switching converter configured to operate in pulse frequency modulation and to implement the above method.

An embodiment provides a power management unit comprising the above converter.

An embodiment provides a microcontroller comprising the above power management unit.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for the understanding of the described embodiments have been illustrated and described in detail. In particular, the usual circuits and applications where a buck switching converter operating in pulse frequency modulation may be implemented have not been described in detail, the described embodiments and variants being compatible with these usual circuits and applications.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., it is referred, unless specified otherwise, to the orientation of the drawings.

Unless specified otherwise, the expressions "about", "approximately", "substantially", and "in the order of" signify plus or minus 10%, preferably of plus or minus 5%.

Figure 1:
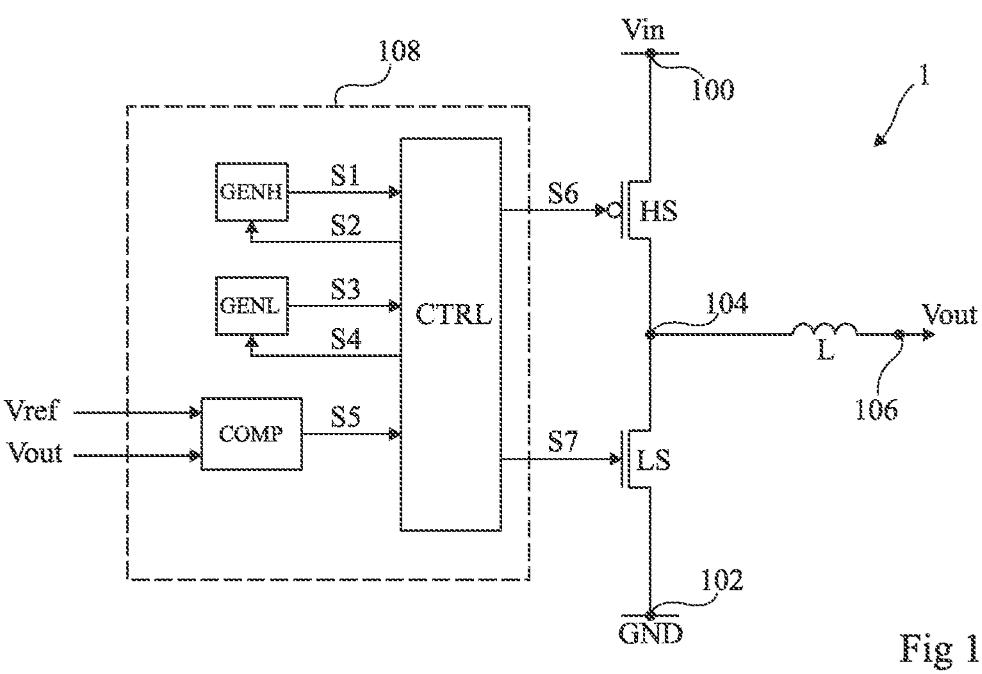
FIG. 1 schematically shows in the form of blocks an example of a buck switching converter operating in pulse frequency modulation.

FIG. 1 schematically shows in the form of blocks an example of a converter 1.

Converter 1 is a switching converter. Converter 1 is a Direct Current-Direct Current (DC-DC) converter. More particularly, converter 1 is configured to receive a DC voltage Vin and to deliver a DC voltage Vout having a value lower than that of voltage Vin. In other words, converter 1 is of buck type. Converter 1 is configured so that voltage Vout has a value equal to a set point value. For example, converter 1 receives a voltage Vref indicating the set point value for voltage Vout. For example, converter 1 is configured so that voltage Vout is equal to voltage Vref.

Converter 1 is configured to operate in pulse frequency modulation (PFM), and thus in discontinuous conduction mode (DCM).

As an example, converter 1 may also be configured to operate in pulse width modulation (PWM), and thus in continuous conduction mode (CCM), converter 1 then alternating between PFM operating phases and PWM operating phases, for example according to the power drawn by a load connected to the output of converter 1.

Converter 1 comprises a high-side switch HS and a low-side switch LS. Switches HS and LS are series-connected between a node 100 configured to receive voltage Vin and a node 102 configured to receive a reference potential, for example the ground GND. The potential Vin on node 100 is, for example, positive with respect to potential GND. Switch HS is connected on the side of node 100, switch LS being connected on the side of node 102. Switches HS and LS are coupled, preferably connected, to each other by a connection node 104. More particularly, switch HS couples node 100 to node 104, and switch LS couples node 104 to node 102.

As an example, switch HS is implemented by a Metal Oxide Semiconductor (MOS) transistor and switch LS is implemented by another MOS transistor. Transistor HS has, for example, a P channel and, for example, has its source coupled, preferably connected, to node 100 and its drain coupled, preferably connected, to node 104. Transistor LS has, for example, an N channel and, for example, has its source coupled, preferably connected, to node 102 and its drain coupled, preferably connected, to node 104.

An inductor L couples node 104 to the output 106 of converter 1 having voltage Vout available thereon. Although this is not shown, a smoothing capacitive element may be connected between output 106 and node 102.

Converter 1 further comprises a circuit 108 for controlling switches HS and LS. Circuit 108 is configured to supply a control signal S6 to switch HS, for example to the gate of transistor HS, and a control signal S7 to switch LS, for example to the gate of transistor LS.

Circuit 108 receives voltage Vout and voltage Vref, and generates signals S6 and S7 to keep voltage Vout at its set point value, for example to keep voltage Vout equal to voltage Vref.

For example, circuit 108 comprises a comparison circuit COMP configured to compare the value of voltage Vout with its set point value, for example to compare voltage Vout with voltage Vref. Circuit 108 is configured to supply a signal S5 indicating the result of this comparison to a circuit CTRL of circuit 108. Circuit CTRL is configured to supply signals S6 and S7.

In pulse frequency modulation, circuit 108 is configured, when voltage Vout becomes smaller than its set point value to generate a current pulse IL in inductor L, that is, to implement an operating cycle, each operating cycle corresponding to a pulse and conversely. During each operating cycle, while switches HS and LS are initially in the off state and the current IL in inductor L is zero, circuit 108 controls transistor HS to the on state for a time period THS, switch LS being maintained off during this time period THS. During the time period of on state THS of switch HS, the current IL in inductor L increases to reach a maximum value or peak Ip at the end of time period THS. Then, still in the same operating cycle, at the end of time period THS, circuit 108 switches switch HS to the off state and switches switch LS to the on state. Circuit 108 controls switch LS to the on state for a time period TLS, switch HS being held off all along time period TLS. During the time period of on state TLS of switch LS, the current IL in inductor L decreases to a minimum value or valley Iv reached at the end of time period TLS. During time period TLS, energy stored in inductor L during time period THS is given back to a load (not shown in FIG. 1) connected to output 106 of converter 1.

In practice, the time periods THS and TLS of device 1 are determined to be constant for a given voltage Vin and, for example, a given operating temperature.

For example, time period THS is determined by a maximum average value of the current that converter 1 should be able to deliver to the load. Indeed, time period THS determines the value Ip of current IL in inductor L and the average maximum value of the current that converter 1 can deliver is then equal to Ip/2.

For example, time period TLS is determined so that, at the end of time period TLS, current IL, or, in other words, the value Iv of current IL at the end of time period TLS, is zero.

As an example, circuit 108 comprises a circuit GENH. Circuit GENH is, for example, configured, at each operating cycle, to receive an indication of the beginning of the cycle, and thus an indication of the beginning of the corresponding time period THS, and to provide an indication of the end of this time period THS. For example, circuit GENH is configured to receive a signal S2 indicating thereto the beginning of each operating cycle, and thus of each time period THS, and to supply, as a response to each beginning of a time period THS, a binary signal S1 which switches at the end of this time period THS. Signal S2 is, for example, supplied by circuit CTRL to circuit GENH, circuit CTRL supplying signal S2, for example, based on signal S5. Signal S1 is, for example, supplied to circuit CTRL, signal S6 being, for example, supplied based on signal S1.

Similarly, circuit 108 comprises, for example, a circuit GENL. Circuit GENL is, for example, configured, at each operating cycle, to receive an indication of the end of the time period THS of this cycle, and thus an indication of the beginning of the corresponding time period TLS, and to provide an indication of the end of this time period TLS. For example, circuit GENL is configured to receive a signal S4 indicating thereto, for each operating cycle, and thus for each time period TLS, the end of the corresponding time period THS and thus the beginning of this time period TLS, and to supply, as a response to each beginning of a time period TLS, a binary signal S3 which switches at the end of time period TLS. Signal S4 is, for example, supplied by circuit CTRL to circuit GENL, circuit CTRL supplying signal S4, for example, based on signal S1. Signal S3 is, for example, supplied to circuit CTRL, signal S7 being, for example, supplied based on signal S3.

As an example, circuit GENH, respectively GENL, comprises a ramp generator and a circuit comparing the ramp with a set point value determined by the desired time period THS, respectively TLS. For example, when circuit GENH, respectively GENL, receives an indication that time period THS, respectively TLS, starts, its ramp generator delivers a voltage ramp starting at the beginning of time period THS, respectively TLS, and this ramp is compared with a voltage representative of a desired time period THS, respectively TLS, by the comparator of circuit GENH, respectively GENL. For example, when signal S2 switches to indicate the beginning of a time period THS to circuit GENH, the ramp of circuit GENH starts and the next switching of the output of the comparator of circuit GENH, which occurs when the ramp crosses the set point value, indicates the end of time period THS to circuit CTRL, the comparator output for example corresponding to signal S1. Similarly, as an example, when signal S3 switches to indicate the beginning of a time period TLS to circuit GENL, the ramp of circuit GENL starts and the next switching of the output of the comparator of circuit GENL, which occurs when the ramp crosses the set point value, indicates the end of time period TLS to circuit CTRL, the comparator output for example corresponding to signal S3.

Figure 2:
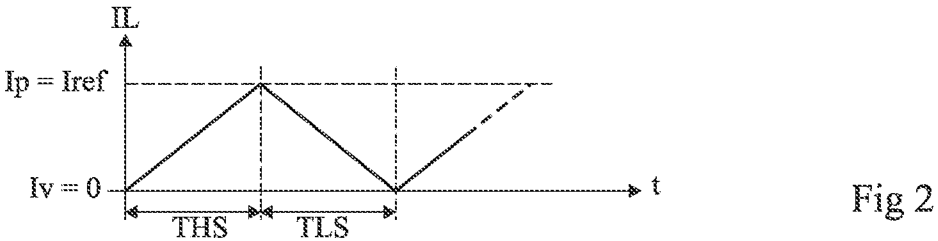
FIG. 2 shows in a timing diagram an expected operation of the converter of FIG. 1.

FIG. 2 shows in a timing diagram an expected operation of the converter of FIG. 1. More particularly, FIG. 2 illustrates the variation of current IL in inductor L during an operating cycle of converter 1. In other words, FIG. 2 illustrates a current pulse IL in the inductor L of converter 1 during an operating cycle of the converter.

In this example, at the beginning of the time period THS of this cycle, the current IL in inductor L is zero. All along time period THS (HS on, LS off), the current IL in inductor L increases, to reach peak value Ip at the end of time period THS. In this example where converter 1 operates as expected, value Ip is equal to a target value Iref. Value Iref determines the maximum average value of the current that converter 1 can supply to a load without losing the regulation of voltage Vout at its set point value.

At the end of time period THS, there starts time period TLS. All along time period TLS (HS off, LS on), the current IL in inductor L decreases, to reach valley value Iv at the end of time period TLS. In this example where converter 1 operates as expected, value Iv is zero. In other words, at the end of the operating cycle (or of the current pulse IL in inductor L), the current IL in inductor L has a zero value. Thus, if this is necessary, for example if voltage Vout is still lower than its target value at the end of the current pulse, a new operating cycle, and thus a new current pulse IL in inductor L, may directly start.

In converter 1, the value Ip of current IL at the end of time period THS is, for example, determined by the following equation (1):

$$Ip = \frac{\text{V in} - \text{V out}}{Rpar} \cdot \left(1 - e^{\frac{-Rpar.THS}{Lval}}\right)$$

with Lval the inductor value of inductor L and Rpar the resistance value of the parasitic resistors, for example of the parasitic resistor of inductor L, of the parasitic resistor of the pads of access to the integrated circuit comprising converter 1 and having potential GND and voltage Vin applied thereto, and of the on-state resistance of switches HS and LS.

Similarly, the value Iv of current IL at the end of time period TLS is, for example, determined by the following equation (2):

$$Iv = Ip.e^{\frac{-Rpar.TLS}{Lval}} - \frac{\text{V out}}{\text{V in}} \cdot \left(1 - e^{\frac{-Rpar.TLS}{Lval}}\right)$$

Thus, it can be seen that values Ip and Iv depend on value Rpar and on value Lval. As a result, even by determining time periods THS and TLS so that Ip is equal to Iref and Iv is zero, the variations of values Rpar and Lval with, for example, temperature and/or manufacturing dispersions, the values Ip and Iv effectively obtained are different from Iref and zero respectively. Further, in practice, circuits GENH and GENL comprise comparators, for example operational amplifiers assembled as comparators, which have switching times which may vary with temperature and/or manufacturing dispersions, and which may thus alter the values of time periods THS and TLS.

Figure 3:
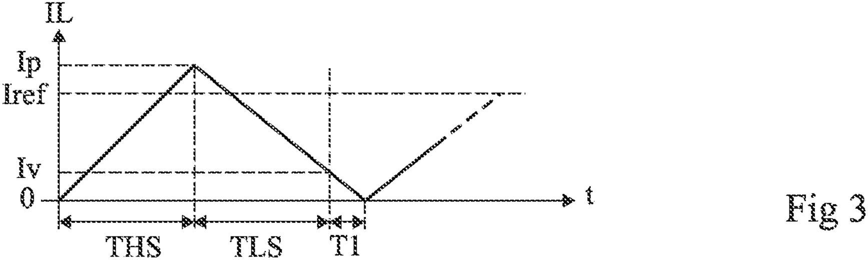
FIG. 3 shows in a timing diagram an unwanted operation of the converter of FIG. 1.

FIG. 3 shows, in a timing diagram, an unwanted operation of the converter of FIG. 1. More particularly, FIG. 3 illustrates the variation of the current IL in inductor L during an operating cycle of converter 1.

In this example, as in that of FIG. 2, at the beginning of time period THS, the current IL in inductor L is zero. All along time period THS (HS on, LS off), the current IL in inductor L increases, to reach peak value Ip at the end of time period THS. However, in this example, conversely to the example of FIG. 2, value Ip is greater than target value Iref. This results, for example, in variations of the switching times of the comparators used to supply signals S1 and S3 indicating respective time periods THS and TLS.

At the end of time period THS, there starts time period TLS. All along time period TLS (HS off, LS on), the current IL in inductor L decreases, to reach valley value Iv at the end of time period TLS. In this example, partly because at the beginning of time period TLS current IL is equal to a value Ip greater than Iref, value Iv is positive, and not zero as in the example of FIG. 2.

As a result, a time period T1 has to be delayed for current IL to return to zero, for example because current IL keeps on flowing through the body diode of transistor LS, before a new operating cycle can start. Further, the conduction of current IL in the body diode of transistor LS exhibits higher losses than when current IL flows through transistor LS in the on state, which degrades the efficiency of converter 1.

An operation of converter 1 where value Iv is positive at the end of an operating cycle is not desirable.

An operation of converter 1 where value Ip is greater than value Iref is not desirable. For example, this results in greater variations of voltage Vout around its set point value.

Figure 4:
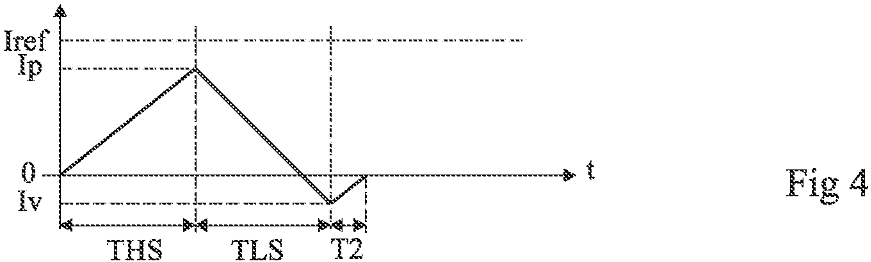
FIG. 4 shows in a timing diagram an unwanted operation of the converter of FIG. 1.

FIG. 4 shows in a timing diagram another unwanted operation of the converter 1 of FIG. 1. More particularly, FIG. 4 illustrates the variation of current IL in inductor L during an operating cycle of converter 1.

In this example, as in that of FIG. 2, at the beginning of time period THS, the current IL in inductor L is zero. All along time period THS (HS on, LS off), the current IL in inductor L increases, to reach peak value Ip at the end of time period THS. However, in this example, conversely to the example of FIG. 2, value Ip is smaller than target value Iref.

At the end of time period THS, there starts time period TLS. All along time period TLS (HS off, LS on), the current IL in inductor L decreases, to reach valley value Iv at the end of time period TLS. In this example, partly because at the beginning of time period TLS current IL is equal to a value Ip smaller than Iref, value Iv is negative, and not zero as in the example of FIG. 2.

As a result, a time period T2 must be delayed for current IL to return to zero, for example because current IL keeps on flowing through the body diode of transistor HS, before a new operating cycle can start.

An operation of converter 1 where value Iv is negative at the end of an operating cycle is not desirable. For example, this induces an overconsumption due to the flowing of current IL during time period T2.

Further, an operation of converter 1 where value Ip is smaller than value Iref is not desirable. For example, this results in converter 1 no longer being able to supply a maximum average current equal to Iref/2.

To avoid the above-described unwanted behaviors illustrated in FIGS. 3 and 4, various solutions have been provided. However, these solutions do not enable to both ascertain that Ip is equal to Iref and that Iv is zero and/or are complex to implement and/or cause dead times between two successive operating cycles.

There is here provided a method of calibration of time periods THS and TLS in a converter of the type of that of FIG. 1, which enables to avoid for value Ip to be different from Iref and for value Iv to be non-zero. For this purpose, the method comprises an alternation of first and second calibration phases. In each first calibration phase, in practice a phase of calibration of time period THS, time period TLS is not modified, or, in other words, is held at its current value. Further, in each first calibration phase, time period THS is adjusted, at each current pulse IL, at least according to the sign of value Iv, to take Iv back to a zero value (or considered as zero) for next pulses. However, the modification of time period THS by the implementation of a first calibration phase may have value Ip diverge from set point value Iref. This is then compensated for by the implementation of one or a plurality of second calibration phases. Each second calibration phase corresponds in practice to a phase of calibration of time period TLS while time period THS is not modified, or, in other words, is held at its current value. In each second calibration phase, the value Ip of a current pulse IL occurring during this second calibration phase is compared with value Iref and time period TLS is adjusted according to the result of this comparison, that is, at least according to the sign of a difference between values Iref and Ip. As a result, the value Iv of the next pulse will no longer be zero and the implementation of a new first calibration phase to take value Iv back to zero will modify value Ip. Preferably, each second calibration phase only corresponds to, or only comprises, a single operating cycle, that is, a single current pulse IL.

Alternating the first and second calibration phases thus amounts to alternating adjustments of time period THS for a constant TLS and adjustments of time period TLS for a constant THS until Ip is equal (or considered as equal) to Iref and Iv is zero (or considered as zero).

Figure 5:
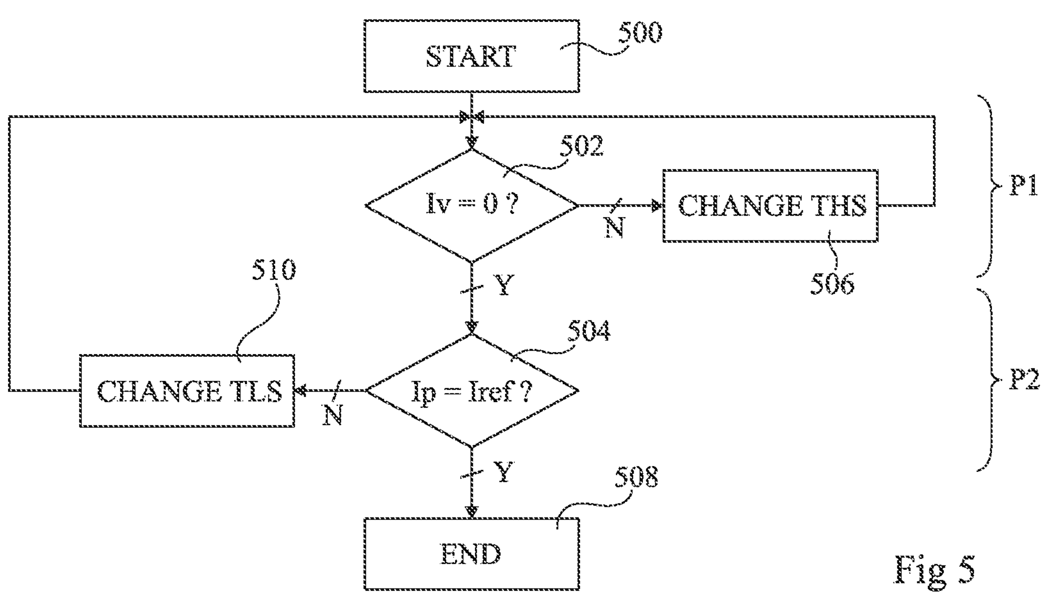
FIG. 5 illustrates in a flowchart an example of a mode of implementation of a calibration method in a switching converter of the type of that of FIG. 1.

FIG. 5 illustrates in a flowchart an example of an implementation mode of a calibration method such as described hereabove, in a switching converter of the type of that of FIG. 1.

At a step 500 (block "START" in FIG. 5), time periods THS and TLS are constant, and, for example, each equal to a predefined initial value.

At a next step 502 (block "Iv=0?" in FIG. 5), a first calibration phase P1 starts. Step 502 comprises, for the current operating cycle, and thus for the current pulse of current IL in inductor L, determining whether the value Iv of the current at the end of time period TLS is zero (or considered as zero) or not, based on at least the sign of this value Iv.

If value Iv is zero or considered as zero (output Y of block 502), this means that the current IL in the inductor is zero or considered as zero at the end of time period TLS, and that it is thus not needed to modify time period THS while keeping time period TLS constant and equal to its current value. The method then carries on at a step 504 (block "Ip=Iref?"). This marks the end of the current first calibration phase P1, and the beginning of a next second calibration phase P2.

Conversely, if value Iv is not zero or not considered as zero (output N of block 502), this means that the current IL in the inductor is not zero or not considered as zero at the end of time period TLS. One thus has to modify time period THS while maintaining time period TLS constant and equal to its current value, to take value Iv back to a zero value for the next pulses. The method then carries on at a step 506 (block "CHANGE THS").

At this step, time period TLS is kept constant and equal to its current value, and time period THS is modified. Time period THS is modified based on the sign of the value Iv determined at the previous step 502.

More particularly, if this value Iv is negative, time period THS is increased. As a result, since the time period TLS is not modified, during the next current pulse IL (or next cycle), the value Iv of this next pulse will be higher, for example closer to zero or greater than zero, than the value Iv measured so that during the last pulse, that is, at the next step 502.

Symmetrically, if the value Iv of the previous step 502 is positive, time period THS is decreased. As a result, since the time period TLS is not modified, during the next current pulse IL (or next cycle), the value Iv of this next pulse will be smaller, for example closer to zero or smaller than zero, than the value Iv measured during the last pulse, that is, at the previous step 502.

Once time period THS has been modified at step 506, the method carries on at step 502. In other words, first calibration phase P1 carries on. Thus, as long as it is remained in first calibration phase P1, for each current pulse IL in inductor L, the two steps 502 and 506 are implemented. First calibration phase P1 ends with a current pulse for which value Iv is zero or considered as zero.

At step 504, which corresponds to the beginning of a second step P2, value Iv is zero due to the implementation of the previous step P1. Step 504 comprises determining whether the value Ip of a current pulse IL occurring during second calibration phase P2, preferably the value Ip of the single current pulse IL occurring during this phase P2, is equal, or considered as equal, to value Iref, at least based on the result of a comparison of this value Ip with value Iref, that is, at least based on the sign of a difference between values Iref and Ip. Preferably, at step 504, only the value Ip of the first current pulse occurring after the beginning of phase P2 is compared with value Iref.

If value Ip is equal, or considered as equal, to Iref (output Y of block 504), second calibration phase P2 and the calibration of time periods THS and TLS are over, and the method ends at a step 508 (block "END").

Conversely, if value Ip is different from Iref (output N of block 504), that is, if Ip is neither equal, nor considered as equal, to Iref, the method carries on at a step 510 (block "CHANGE TLS").

At this step 510, time period THS is kept constant and equal to its current value, that is, the value obtained at the end of the previous first calibration phase P1, and time period TLS is modified. Time period TLS is modified based on the result of the comparison of value Ip with value Iref and, more particularly, based on the fact that value Ip is either greater, or smaller, than value Iref. Once this step 510 has been implemented, second calibration phase P2 ends, and the method carries on at step 502, or, in other words, a new phase P1 is implemented.

More particularly, at step 510, if this value Ip is greater than value Iref, time period TLS is decreased. As a result, since time period THS is not modified, during the next current pulse IL (or next cycle), the value Iv of this next pulse will be greater than zero. Thus, during the next phase P1, time period THS will be decreased to take value Iv closer to zero, which will decrease value Ip and will take it closer to value Iref.

Conversely, at step 510, if value Ip is smaller than value Iref, time period TLS is increased. As a result, since time period THS is not modified, during the next current pulse IL (or next cycle), the value Iv of this next pulse will be smaller than zero. Thus, during the next phase P1, time period THS will be increased to take value Iv closer to zero, which will increase value Ip and will take it closer to value Iref.

Thus, by alternating the first and the second calibration phases, values Ip and Iv respectively converge towards value Iref and towards a zero value.

According to an embodiment, the method of FIG. 5 is periodically implemented.

As a variant, when at step 504, value Ip is equal to (or considered as equal to) Iref, rather than ending the calibration method at step 508, the method carries on at step 502, so that, if one and/or the other of values Iv and Ip varies, for example due to a temperature change, this is immediately detected and time periods THS and TLS are accordingly recalibrated.

According to another variant, when at step 504, value Ip is equal to (or considered as equal to) Iref, rather than ending the calibration method at step 508, the method carries on at a first additional step similar to step 502, this first additional step being looped back on itself as long as Iv is zero, and being followed by a second additional step similar to step 506 as soon as value Iv is no longer zero, this second additional step being for example followed by the first additional step. In other words, in this other variant, once time periods THS and TLS have been adjusted so that Iv is zero (or considered as zero) and Ip is equal to Iref (or considered as equal to Iref), the method carries on by only implementing phases P1.

This other variant takes advantage from the fact that, from one converter 2 to another, and in the absence of implementation of the method of FIG. 5, the variation of value Ip between these two converters essentially results from manufacturing dispersions on the value of the inductors L of the converters. Thus, once time periods TLS and THS have been adjusted so that Ip is equal to (or considered as equal to) Iref, that is, to take into account manufacturing dispersions of inductor L, even while only modifying time period THS to keep Iv at a zero value (or considered as zero), the modifications of value Ip are negligible, and value Ip remains considered as equal to Iref.

Preferably, in the above-described method, at each increase, respectively decrease, of time period THS, time period THS is increased, respectively decreased, by a same quantity (or adjustment pitch). Similarly, preferably, in the above-described method, at each increase, respectively decrease, of time period TLS, time period TLS is increased, respectively decreased, by a same quantity (or adjustment pitch).

Preferably, the pitch of adjustment of value Ip is greater than the pitch of adjustment of value Iv, for example when the step 508 of the above method is replaced with an implementation of phases P1 only.

According to an embodiment, during each step 502, a signal directly indicates whether value Iv is zero (or considered as zero) or not.

In an alternative embodiment, during each step 502, no signal directly indicates whether value Iv is zero (or considered as zero) or not. In such a variant, during the step 502 of a phase P1, the determination that the value Iv of the current pulse is zero (or considered as zero) or not is performed based on the sign of value Iv. For example, value Iv is considered as zero if the sign of the value Iv of the current pulse has changed as compared with that of the previous current pulse IL of this phase P1. As an alternative example, value Iv is considered as zero if the current pulse is the last of a series of successive current pulses IL of this phase P1 and the sign of value Iv changes at each of the pulses of this series of current pulses IL. The number of current pulses in each series of pulses is, for example, the same for all the series of pulses, and is, for example, a parameter of configuration of the method. As another alternative example, value Iv is considered as zero if the current pulse is the last of a series of successive current pulses IL of this phase P1 and, in average, for this series of pulses, the sign of value Iv is as many times of a first type, for example positive, than of a second type, for example negative, to within a tolerance enabling to cover the measurement noise. The number of current pulses in each series of pulses and/or the tolerance relative to the equality between the number of times when the sign of value Iv is of the first type and the number of times when sign Iv is of the second type are, for example, identical for all the series of pulses, and are, for example, parameters of configuration of the method.

In still another alternative embodiment, as in the previous alternative embodiment, during each step 502, no signal directly indicates whether value Iv is zero (or considered as zero) or not. In this other variant, during the step 502 of a phase P1, the determination that the value Iv of the current pulse is zero (or considered as zero) or not is performed based on the variation of a set point value of time period THS during a plurality of current pulses IL of this phase P1.

According to an embodiment, during each step 504, a signal directly indicates whether value Ip is equal (or considered as equal) to Iref, or not.

In an alternative embodiment, during each step 504, no signal directly indicates whether value Ip is equal (considered as equal) to Iref or not. In such a variant, during the step 504 of a phase P2, the determination that the value Ip of the current pulse of this phase P2 is equal (considered as equal) to Iref or not is performed based on the sign of the difference (or interval) between values Iref and Ip. For example, value Ip is considered as equal to Iref if the sign of the interval between these values for the current pulse has changed as compared with that of the interval between values Ip and Iref of the current pulse IL of the previous phase P2. As an alternative example, value Ip is considered as equal to Iref if the current pulse of phase P2 is the last of a plurality of pulses, each corresponding to a phase P2 of a series of successive phase P2, and the sign of the interval between values Ip and Iref has changed at each of the pulses of this plurality of pulses, that is, at each phase P2 of the series of successive phases P2. The number of phases P2 in each series of pulses is, for example, the same for all the series of successive phases P2, and is, for example, a parameter of configuration of the method. As another alternative example, value Ip is considered as equal to Iref if the current pulse is the last of a plurality of pulses, each corresponding to a phase P2 of a series of successive phases P2 and, in average, for this pulse series, the sign of the interval between values Ip and Iref is as many times of a first type, for example positive, than of a second type, for example negative, to within a tolerance enabling to cover the measurement noise. The number of phases P2 in each series of pulses and/or the tolerance relative to the equality between the number of time that the sign of the interval between values Ip and Iref is of the first type and the number of times that sign Iv is of the second type are, for example, identical for all the series of pulses, and are, for example, parameters of configuration of the method.

In still another alternative embodiment, as in the previous alternative embodiment, during each step 504, no signal directly indicates whether value Ip is equal (or considered as equal) to Iref or not. In this other variant, during the step 504 of a phase P2, the determination that the value Ip of the corresponding pulse is equal (or considered as equal) to Iref or not is performed based on the variation of a set point value of time period TLS during a plurality of successive phases P2.

Figure 6:
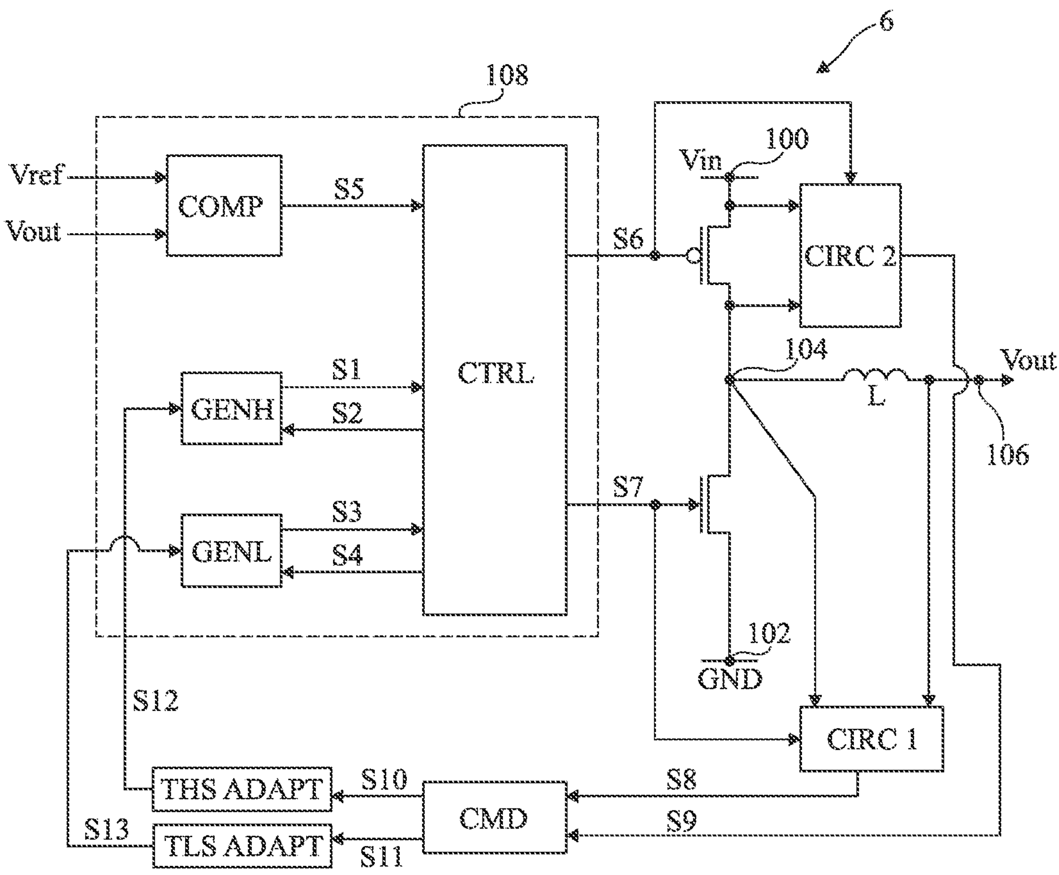
FIG. 6 schematically shows in the form of blocks an example of embodiment of a converter adapted to implementing the method of FIG. 5.

FIG. 6 schematically shows in the form of blocks an example of embodiment of a converter 6 adapted to implementing the method of FIG. 5.

Converter 6 comprises many elements in common with converter 1, and only the differences between these two converters are here detailed. In particular, unless specified otherwise, all that has been indicated for converter 1 applies to converter 6.

Converter 6 differs from the previously-described converter 1 in that it comprises an additional circuit CIRC 1. Circuit CIRC 1 is configured to determine the sign of the value Iv of each pulse during the implementation of the first calibration phases P1. Circuit CIRC 1 delivers an output signal S8 indicating at least the sign of value Iv.

According to an embodiment, circuit CIRC 1 is further configured to indicate when value Iv is zero, or considered as zero. Output signal S8, for example over a plurality of bits, then also indicates whether value Iv is zero (or considered as zero) or not.

In this example, circuit CIRC 1 receives the voltage on node 204 and voltage Vout, and determines the sign of value Iv at the end of time period TLS due to these two voltages.

Preferably, to know the end of the time period TLS of each current pulse IL, circuit CIRC 1 also receives a signal indicating when a time period TLS ends, for example signal S7 in the example of FIG. 6. When circuit CIRC 1 receives a signal to indicate thereto the end of time period TLS, circuit CIRC 1 may comprise a storage element, for example a D flip-flop, configured to store the sign of value Iv at the end of each time period TLS during each first calibration phase P1.

As an example, circuit CIRC 1 comprises the circuit of FIG. 5 or the circuit of FIG. 6 of United States Patent Application Publication No. 2021/0135574, incorporated herein by reference. In these circuits, the state of nodes 551 and 552 indicate whether the current IL at the end of time period TLS is positive, negative, or zero.

Comparator 6 further comprises a circuit CIRC 2. Circuit CIRC 2 is configured to determine whether the value Ip of each pulse during the implementation of second calibration phases P2 is greater than or smaller than Iref. Circuit CIRC 2 supplies an output signal S9 indicating at least whether value Ip is greater or smaller than Iref. As an example, circuit CIRC 2 comprises a circuit, or current sensor, configured to supply a signal representative of the value of current IL in the inductor at the end of the time period THS of each current pulse during the implementation of phases P2. For example, this current sensor receives the voltage across switch HS. Circuit CIRC 2 further comprises, for example, a comparator receiving the output signal of the current sensor and configured to compare the value of current IL with value Iref.

According to an embodiment, circuit CIRC 2 is further configured to determine whether the value Ip of each pulse during the implementation of the second calibration phases P2 is equal, or considered as equal, to Iref. Output signal S9 then also indicates whether value Ip is equal (or considered as equal) to Iref or not, which signal S9 may be over a plurality of bits. As an example, circuit CIRC 2 comprises a circuit, or current sensor, configured to supply a signal representative of the value of the current IL in the inductor at the end of the time period THS of each current pulse during the implementation of phases P2. For example, this current sensor receives the voltage across switch HS. Circuit CIRC 2 then comprises, for example, a first comparator receiving the output signal of the current sensor and configured to compare the value of the current with a high limiting value of a range of values where IL is considered as equal to Iref, and a second comparator receiving the output signal of the current sensor and configured to compare the value of the current with a low limiting value of the range of values where IL is considered as equal to Iref.

Preferably, to know the end of the time period THS of each current pulse IL, circuit CIRC 2 also receives a signal indicating when a time period THS ends, for example signal S6 in the example of FIG. 6. When circuit CIRC 2 receives a signal to indicate thereto the end of time period THS, circuit CIRC 2 may comprise a storage element, for example a D flip-flop, configured to store the result of the comparison of value Ip with value Iref at the end of each time period THS during each second calibration phase P2.

Converter 9 further comprises a control circuit CMD, preferably a digital circuit, configured to receive signals S8 and S9. Based on signals S8 and S9, circuit CMD is configured to implement steps 502, 506, 504, and 510 of the method described in relation with FIG. 5. In particular, circuit CMD is configured to supply, based on signal S8, a signal S10 indicating whether time period THS should be left unchanged, increased, or decreased, and, based on signal S9, a signal S11 indicating whether time period TLS should be left unchanged, increased, or decreased.

Thus, based on signal S8, that is, based at least on the sign of value Iv, circuit CMD is configured, for each current pulse IL in the inductor L during the implementation of the first calibration phases P1, to determine whether time period THS should be modified or not, and, when it should be modified, to determine whether this time period should be increased or decreased.

As an example, circuit CMD comprises a digital integrator configured to integrate signal S8, and signal S10 is determined by an output signal of the digital integrator.

According to an embodiment where the output signal S8 of circuit CIRC 1 does not indicate whether value Iv is zero (or considered as zero) or not, circuit CMD is configured to determine, for each current pulse IL during each phase P1, whether value Iv is considered as zero or not, based on the sign of the value Iv of a plurality of successive current pulses IL. For example, as mentioned in relation with FIG. 5, circuit CMD considers that the value Iv of the current pulse of current IL of a phase P1 is zero if its sign has changed as compared with that of the value Iv of the previous current pulse IL of this phase P1. As an alternative example, as mentioned in relation with FIG. 5, circuit CMD considers that the value Iv of the current pulse of current IL is zero if this current pulse IL is the last of a given number of successive current pulses IL of a phase P1 for which the sign of value Iv changes for each pulse, that is, oscillates during these successive pulses.

Further, based on signal S9, that is, based at least on the result of the comparison of value Ip with value Iref, or, in other words, on the sign of the difference between values Ip and Iref, circuit CMD is configured, for each current pulse IL in inductor L during the implementation of the second calibration phases P2, to determine whether time period TLS should be modified or not, and, when it should be modified, to determine whether time period TLS should be increased or decreased.

As an example, circuit CMD comprises a digital integrator configured to integrate signal S9, and signal S11 is determined by an output signal of the digital integrator.

According to an embodiment where the output signal S9 of circuit CIRC 2 does not indicate whether value Ip is equal to Iref (or considered as equal to Iref) or not, circuit CMD is configured to determine, for each current pulse IL during each phase P2, whether value Ip is considered as equal to Iref or not, based on the sign of a difference between the values Ip and Iref of the current pulses IL corresponding to a plurality of successive phases P2. For example, as mentioned in relation with FIG. 5, during a current phase P2, circuit CMD considers that the value Ip of the current pulse IL of this phase P2 is equal to Iref if the sign of the interval between values Ip and Iref for this pulse has changed as compared with that of the interval between the values Ip and Iref of the current pulse IL corresponding to the previous phase P2. As an alternative example, as mentioned in relation with FIG. 5, during a current phase P2 corresponding to a last phase P2 of a series of a plurality of phases P2, circuit CMD considers that the value Ip of the current pulse is equal to Iref if the sign of the interval between values Ip and Iref changes for each of the current pulses IL corresponding to the plurality of phases P2 in the series, that is, if the sign of this difference between values Ip and Iref oscillates during current pulses IL corresponding to the plurality of phases P2 in the series.

As compared with converter 1, to be able to vary time periods THS and TLS, circuits GENH and GENL are controllable.

In particular, circuit GENH is then configured, when it receives a signal indicating thereto the beginning of a time period THS, to indicate the end of this time period THS, for example by switching signal S1 at the end of time period THS, and the value of this time period THS is controlled by a signal S12, signal S12 indicating the set point value of time period THS. In other words, circuit GENH is configured to supply a signal S1 representative of a time period THS and to receive a signal S12 indicating the set point value of this time period THS.

Similarly, circuit GENL is then configured, when it receives a signal indicating thereto the beginning of a time period TLS, to indicate the end of this time period TLS, for example by switching signal S2 at the end of time period TLS, and the value of this time period TLS is controlled by a signal S13, signal S13 indicating the set point value of time period TLS. In other words, circuit GENL is configured to supply a signal S2 representative of a time period TLS and to receive a signal S13 indicating the set point value of this time period TLS.

Converter 6 further comprises a circuit THS ADAPT configured to receive signal S10 and to supply signal S12 based on signal S10, that is, to update the set point value of time period THS based on signal S10. As a variant, circuit THS ADAPT forms part of circuit CMD, which then directly supplies signal S12.

Similarly, converter 6 comprises a circuit TLS ADAPT configured to receive signal S11 and to supply signal S13 based on signal S11, that is, to update the set point value of time period TLS based on signal S13. As a variant, circuit TLS ADAPT forms part of circuit CMD, which then directly supplies signal S13.

The implementation of circuit GENH, GENL, THS ADAPT, TLS ADAPT, CMD, CIRC 1, and CIRC 2 so that converter 6 implements the method of FIG. 5 is within the abilities of those skilled in the art based on the functional indications given hereabove.

Figure 7:
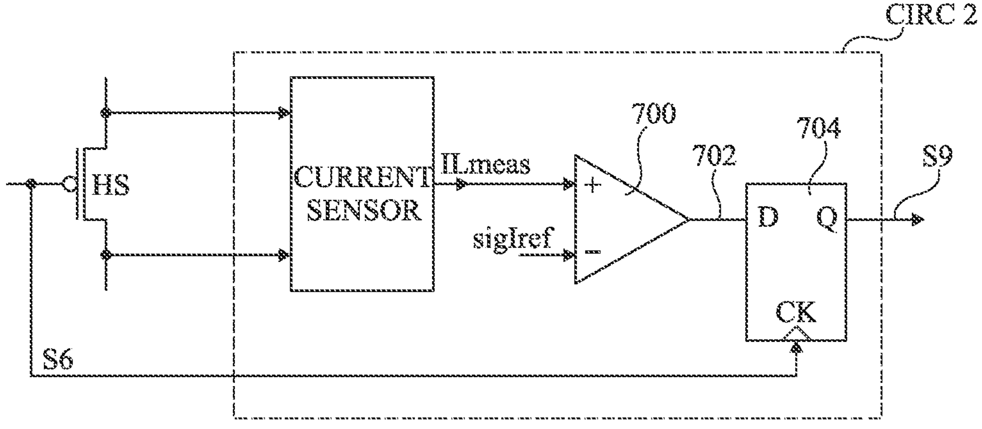
FIG. 7 shows in more detailed fashion an example of embodiment of a circuit of the converter of FIG. 6.

FIG. 7 shows in more detailed fashion an example of embodiment of the circuit CIRC 2 of the converter 6 of FIG. 6. In FIG. 7, the transistor HS of converter 6 is also shown, although it does not form part of circuit CIRC 2.

According to an embodiment, as illustrated in FIG. 7, circuit CIRC 2 comprises a circuit CURRENT SENSOR configured to measure the value of the current IL in transistor HS during time period THS. Thus, circuit CURRENT SENSOR is connected to the two main conduction terminals of switch HS, to receive the voltage across switch HS. Circuit CURRENT SENSOR is also configured to deliver, based on the voltage across switch HS, a signal ILmeas having its value indicating the value of the current IL in switch HS during each time period THS.

As a variant, not illustrated, circuit CIRC 2 comprises a circuit CURRENT SENSOR configured to supply signal ILmeas indicating the value of current IL in inductor L based on another quantity than the voltage across switch HS, which circuit CIRC 2 can then not be connected across switch HS, but for example across inductor L.

According to an embodiment, as illustrated in FIG. 7, circuit CIRC 2 comprises a circuit 700, for example a comparator implemented by an operational amplifier, configured to compare the value of current IL with value Iref. Circuit 700 then receives a signal indicating the value of current IL, in this example signal ILmeas, and a signal indicating value Iref, in this example a signal sigIref. In the example of FIG. 7, signals ILmeas and sigIref are supplied to the inputs of an operational amplifier configured as a comparator. Circuit 700 supplies a binary signal 702 indicating whether current IL is greater or smaller than Iref.

According to an embodiment, as illustrated in FIG. 7, circuit CIRC 2 comprises a storage element 704, for example a D flip-flop, configured to store the state of signal 702 at each end of a time period THS. To know the end of each time period THS, as an example, flip-flop 704 receives signal S6 on its synchronization input CK. Storage element 704 supplies signal S9.

As a variant, the storage of signal 702 to obtain signal S9 is omitted, and signal S9 then correspond to signal 702. The storage of the state of signal S9 at the end of each time period THS can then be implemented in circuit CMD.

In this embodiment where circuit CIRC 2 only comprises one comparator 700, signal S9 does not indicate whether the current value Ip is or not equal to Iref. In this case, circuit CMD (FIG. 6) is configured to determine whether current Ip is considered as equal to Iref at a current step 504 (FIG. 5), based on the sign of the difference between the values Ip and Iref of a plurality of current pulses IL corresponding to a plurality of successive phases P2.

As a variant, circuit CIRC 2 comprises two comparators 700, one configured to compare the value of current IL with a value Iref+, value Iref+ being greater than Iref, and the other configured to compare the value of current IL with a value Iref−, value Iref-being smaller than Iref. Thus, the outputs of the two comparators enable to know whether the value of current IL is smaller than Iref−, and thus smaller than Iref, whether the value of current IL is greater than Iref+, and thus greater than Iref, or whether the value of current IL is between Iref+ and Iref− and is then considered, in such a variant, as equal to Iref. In such a variant, signal S9 is determined based on the outputs of the two comparators, and is, for example, a signal over two bits. In such a variant, circuit CIRC 2 may comprise two storage elements configured to store the outputs of the two comparators at the end of each time period THS.

Figure 8:
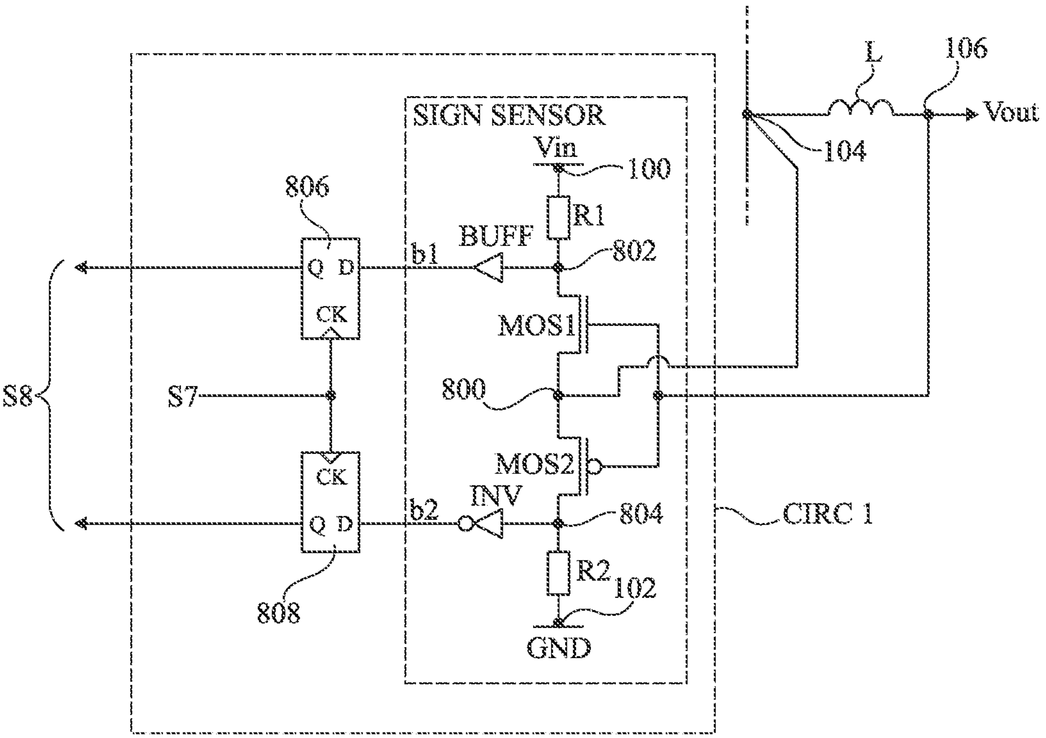
FIG. 8 shows in more detailed fashion an example of embodiment of another circuit of the converter of FIG. 6.

FIG. 8, shows in more detailed fashion an example of embodiment of the circuit CIRC 1 of the converter 6 of FIG. 6. In FIG. 8, inductor L and nodes 104 and 106 are also shown.

According to an embodiment, as illustrated in FIG. 8, circuit CIRC 1 comprises a circuit SIGN DETECTOR. Circuit SIGN DETECTOR is configured, based on the voltage of node 104 and on the voltage Vout of node 106, to supply two binary signals indicating, at the time when switch LS switches to the off state, that is, at the end of each time period TLS, whether current IL is positive, negative, or zero.

In this example, circuit SIGN DETECTOR is similar to the circuit of FIG. 5 of the previously-mentioned patent applications. More particularly, circuit SIGN DETECTOR comprises two MOS transistors MOS1 and MOS2 series-coupled between nodes 100 and 102. Circuit SIGN DETECTOR is configured so that the voltage of node 104 determines the on or off state of each of transistors MOS1 and MOS2.

For example, the two transistors MOS1 and MOS2 are both in a same state, the off state in this embodiment, when the voltage of node 104 is equal to the voltage Vout of node 106, transistors MOS1 and MOS2 are respectively on and off when both switches HS and LS are off and current IL is non-zero and positive, whereby the voltage of node 104 is equal to −Vdiode, with Vdiode the voltage (in absolute value) across transistor LS, and transistors MOS1 and MOS2 are respectively off and on when both switches HS and LS are off and current IL is negative, whereby the voltage of node 104 then is equal to Vin+Vdiode, with Vdiode the voltage (in absolute value) across transistor HS.

For example, transistor MOS1 is an NMOS transistor having its source connected to an inner node 800 configured to receive the voltage of node 104, its drain connected to a node 802 coupled to node 100 by a resistor R1, and its gate configured to receive voltage Vout, transistor MOS2 being a PMOS transistor having its source connected to node 800, its drain connected to a node 804 coupled to node 102 by a resistor R2, and its gate configured to receive voltage Vout.

Resistors R1 and R2 are selected to have the following behavior. When current IL is zero, both transistors MOS1 and MOS2 are off, the voltage of node 802 is equal to Vin (high state) and the voltage of node 804 is zero (low state). Further, when current IL is negative and switches HS and LS are off, transistor MOS1 is off and transistor MOS2 is on, whereby the voltage of node 802 is equal to Vin (high state) and the voltage of node 804 is closer to Vin than to zero (high state). Conversely, when current IL is positive and switches HS and LS are off, transistor MOS1 is on and transistor MOS2 is off, whereby the voltage of node 802 is closer to zero than to Vin (low state) and the voltage of node 802 is zero (low state).

Thus, according to the high or low state of nodes 802 and 804 when both switches HS and LS are off, it is possible to determine whether current IL is zero, positive, or negative.

For example, node 802 is connected to the input of a buffer circuit BUFF of circuit SIGN DETECTOR, and node 804 is connected to the input of an inverter circuit INV of circuit SIGN DETECTOR. Circuit BUFF supplies a bit b1, and circuit INV supplies a bit b2, the state of bits b1 and b2 being determined based on the voltage levels on respective nodes 802 and 804.

According to an embodiment, as illustrated in FIG. 8, circuit CIRC 1 comprises a storage element 806, for example a D flip-flop, configured to store the state of bit b1 at the end of each time period TLS. To know the end of each time period TLS, as an example, flip-flop 806 receives signal S7 or the delayed signal S7 on its synchronization input CK, the delay applied to signal S7 enabling to ascertain that the storage of bit b1 is effectively performed at a time when switches HS and LS are off and bit b1 is representative of the sign of current IL. Similarly, circuit CIRC 1 comprises a storage element 808, for example a D flip-flop, configured to store the state of bit b2 at the end of each time period TLS. To know the end of each time period TLS, as an example, flip-flop 808 receives, like flip-flop 806, signal S7 or the delayed signal S7 on its synchronization input CK, the delay applied to signal S7 enabling to ascertain that the storage of bit b2 is effectively performed at a time when switches HS and LS are off and bit b1 is representative of the sign of current IL. Signal S9 is then determined by the outputs of the two storage elements 806 and 808, and for example corresponds to the concatenation of these two outputs.

As a variant, elements 806 and 808 are omitted from circuit CIRC 1 and may form part of circuit CMD, signal S9 then being determined by bits b1 and b2, and for example corresponding to the concatenation of these two bits.

In the above-described example of embodiment, signal S8 does not indicate whether the current value Iv is zero (or considered as zero). In this case, during a current phase P1, circuit CMD (FIG. 6) is configured to determine whether value Iv is considered as zero based on the sign of the value Iv of a plurality of current pulses IL of this phase P1.

Figure 9:
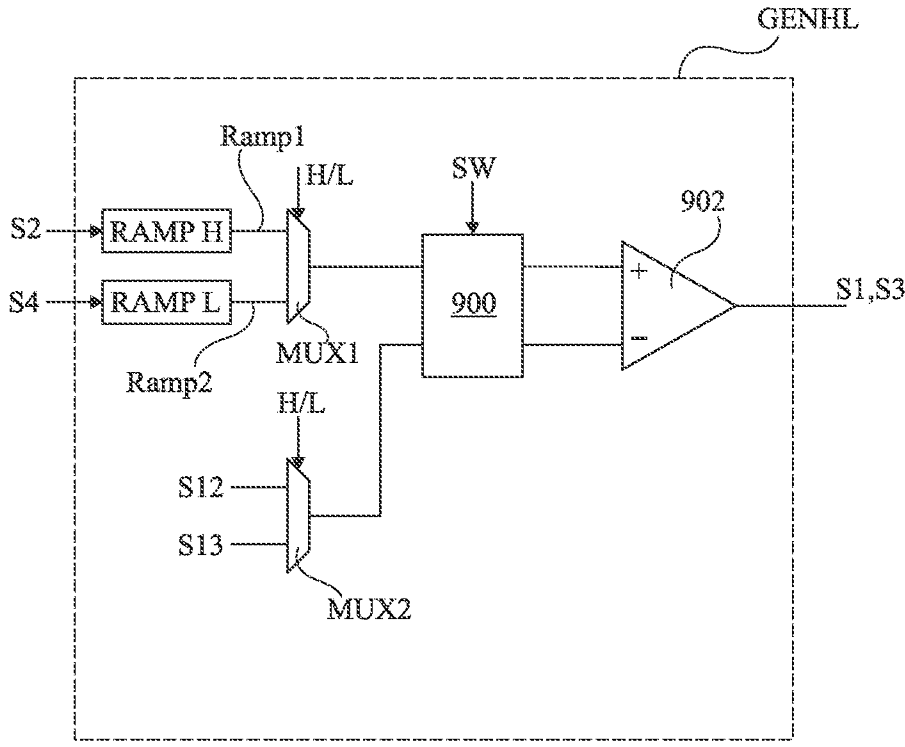
FIG. 9 shows in more detailed fashion an example of embodiment of two circuits of the converter of FIG. 6.

FIG. 9 shows in more detailed fashion an example of embodiment of the two circuits GENH and GENL of the converter 6 of FIG. 6. In this example of embodiment, the two circuits GENH and GENL are implemented by a same circuit bearing reference GENHL in FIG. 9.

Circuit GENHL comprises a ramp generator RAMP H configured to receive an indication of the beginning of each time period THS, for example to receive signal S2, and to generate a new voltage ramp Ramp1 each time it receives an indication of the beginning of a time period THS.

Similarly, circuit GENHL comprises a ramp generator RAMP L configured to receive an indication of the beginning of each time period TLS, for example to receive a signal S4, and to generate a voltage ramp Ramp2 each time it receives an indication of the beginning of a time period TLS.

In this example, the outputs of circuits RAMP H and RAMP L delivering ramps Ramp1 and Ramp2 are supplied to two inputs of a selection circuit MUX1 controlled by a signal H/L, for example supplied by circuit CTRL (FIG. 6). Signal H/L is in a first binary state during each time period THS, and in a second binary state during each time period TLS, circuit MUX1 being configured to supply the output of circuit RAMP H on its output when signal H/L is in the first binary state, and to supply the output of circuit RAMP L on its output when signal H/L is in the second binary state.

Circuit GENHL receives signals S12 and S13, that is, the set point signals of the values of time periods THS and TLS.

In this example, signals S12 and S13 are supplied to two inputs of a selection circuit MUX2 controlled by signal H/L. Circuit MUX2 is configured to supply signal S12 on its output when signal H/L is in the first binary state, and to supply signal S13 on its output when signal H/L is in the second binary state.

In this example, the outputs of circuits MUX1 and MUX2 are coupled to the two inputs of a comparator 902. Thus, comparator 902 supplies signal S1 when signal H/L is in the first binary state, and signal S3 when signal H/L is in the second binary state.

Optionally, as illustrated in FIG. 9, the outputs of circuits MUX1 and MUX2 are coupled to the respective inputs of comparator 902 by a circuit 900 controlled by a binary signal SW, for example supplied by circuit CTRL (FIG. 6). When signal SW is in a first binary state, the output of circuit MUX1 is transmitted by circuit 902 to a first one of the two inputs of comparator 902 and the output of circuit MUX2 is transmitted by circuit 902 to the second one of the two inputs of comparator 902. Conversely, when signal SW is in a second binary state, the output of circuit MUX1 is transmitted by circuit 902 to the second one of the two inputs of comparator 902 and the output of circuit MUX2 is transmitted by circuit 902 to the first one of the two inputs of comparator 902. Thus, by periodically alternating the first and second binary state of signal SW, this enables to smooth the input offset effect between the two inputs of comparator 900.

In the example of FIG. 9, circuits MUX1 and MUX2 enable to supply signals S12 and S13 with a single comparator 902.

In other examples not illustrated, circuit GEN H comprises circuit RAMP H and comparator 902 receives the output of circuit RAMP H and signal S12 on its inputs, directly or optionally via circuit 900, circuit GEN L then comprising circuit RAMP L and another comparator 902 receiving the output of circuit RAMP H and signal S12 on its inputs, directly or optionally via another circuit 900. In this case, the comparator 902 receiving the output of circuit GEN H and signal S12 supplies signal S1, and the other comparator 902 receiving the output of circuit GEN L and signal S13 supplies signal S2.

The method described in relation avec FIG. 6, when it is implemented in a buck switching converter operating in PFM, for example in converter 6, enables to ascertain that the values Iv and Ip of current IL during current pulses in the inductor are respectively zero and equal to Iref.

According to an embodiment, a buck switching converter operating in PFM and configured to implement the described method, for example converter 6, forms part of a power management unit, that is, an integrated circuit forming part of an integrated circuit chip and being configured to receive one or a plurality of power supply voltage of the chip, and to deliver one or a plurality of power supply voltages to circuits of the chip.

According to an embodiment, the power management unit comprising such a converter forms part of a microcontroller.

Various embodiments and variants have been described. Those skilled in the art will understand that certain features of these various embodiments and variants may be combined, and other variants will occur to those skilled in the art. In particular, the method of FIG. 5 may be implemented in buck switching converters operating in PFM of the type of that described in relation with FIG. 6 but exhibiting differences with converter 6. For example, in a converter of the type of that of FIG. 6, the implementation of circuit CIRC 1 is not limited to the implementation described in relation with FIG. 8 and/or the implementation of circuit CIRC 2 is not limited to the implementation described in relation with FIG. 7 and/or the implementation of circuits GEN H and GEN L is not limited to the implementation described in relation with FIG. 9.

Finally, the practical implementation of the described embodiments and variants is within the abilities of those skilled in the art based on the functional indications given hereabove.

The invention claimed is:

1. A method of calibration of a buck switching converter operating in pulse frequency modulation, the method comprising:

alternating between first and second calibration phases;

wherein each first calibration phase comprises:

keeping constant a time period of on state of a low-side switch during the first calibration phase; and for each current pulse in an inductor of the buck switching converter during the first calibration phase, determining a sign of a value of the current pulse at an end of the time period of on state of the low-side switch;

modifying a time period of on state of a high-side switch of a next current pulse during the first calibration phase based on the determined sign; and wherein each second calibration phase comprises:

keeping constant the time period of an on state of the high-side switch during the second calibration phase; and for each current pulse in the inductor of the buck switching converter during said second calibration phase, comparing a value of the current pulse at the end of the time period of on state of the high-side switch with a target value; and modifying a time period of on state of the low-side switch of the next current pulse during the second calibration phase based on said comparison.

2. The method according to claim 1, wherein alternating between first and second calibration phases comprises a initial first calibration phase followed by a next first calibration phase following the second calibration phase, and wherein the time period of on state of the low-side switch is kept constant and equal to an initial value during the initial first calibration phase, and wherein the time period of on state of the low-side switch during the next first calibration phase is kept constant and equal to the time period of on state of the low-side switch modified during the second calibration phase which precedes said next first calibration phase.

3. The method according to claim 1, wherein, at each first calibration phase of the alternating first and second calibration phases, the time period of on state of the high-side switch of the next current pulse is increased if the determined sign is negative, and is decreased if the determined sign is positive.

4. The method according to claim 1, wherein, at each second calibration phase of the alternating first and second calibration phases, the time period of on state of the low-side switch is increased if the comparison indicates that the value of the current at the end of the time period of on state of the high-side switch is lower than the target value and is decreased if the comparison indicates that the value of the current at the end of the time period of on state of the high-side switch is higher than the target value.

5. The method according to claim 1, wherein comparing to the target value comprises:

supplying a signal indicating an instantaneous value of the current with a current sensor;

comparing said signal with a signal indicating the target value with a comparator; and storing a signal indicating the result of the comparison with a synchronous flip-flop controlled based on a signal for controlling the high-side switch.

6. The method according to claim 1, wherein determining the sign of the value of the current at the end of the time period of on state of the low-side switch comprises:

determining a sign of the current in the inductor with a circuit based on a voltage on a node of connection of the low-side switch and on an output voltage of the buck switching converter; and storing the determined sign with a synchronous flip-flop controlled based on a signal for controlling the low-side switch.

7. A method of calibration of a buck switching converter operating in pulse frequency modulation with a high-side switch and low-side switch, the method comprising:

performing a first calibration phase over a first plurality of current pulses in an inductor of the buck switching converter by:

holding an on state time period of the low-side switch constant for each current pulse of the first plurality of current pulses;

determining a sign of a value of the current pulse at the end of each on state time period of the low-side switch; and adjusting an on state time period of the high-side switch based on the sign of the value;

performing a second calibration phase after the first calibration phase over a second plurality of current pulses in the inductor of the buck switching converter where:

holding the on state time period of the high-side switch constant for each current pulse of the second plurality of current pulses at a value set in response to performing the first calibration phase;

comparing a value of the current pulse at the end of each on state time period of the high-side switch with a target value; and adjusting an on state time period of the low-side switch based on the comparison.

8. The method according to claim 7, further comprising:

performing a further first calibration phase after the second calibration phase by:

holding the on state time period of the low-side switch constant for each current pulse of the first plurality of current pulses at a value set in response to performing the second calibration phase;

determining a sign of a value of the current pulse at the end of each on state time period of the low-side switch; and adjusting an on state time period of the high-side switch based on the sign of the value.

9. The method according to claim 7, wherein adjusting the on state time period of the high-side switch at each first calibration phase comprises increasing the on state time period when the determined sign is negative, and decreasing the on state time period when the determined sign is positive.

10. The method according to claim 7, wherein adjusting the on state time period of the low-side switch at each second calibration phase comprises increasing the on state time period when the comparison indicates that the value of the current pulse is lower than the target value and decreased the on state time period when the comparison indicates that the value of the current pulse is higher than the target value.

11. A microcontroller comprising the power management unit according to claim 7.

* * * * *